United States Patent Office 3,606,351
Patented Sept. 20, 1971

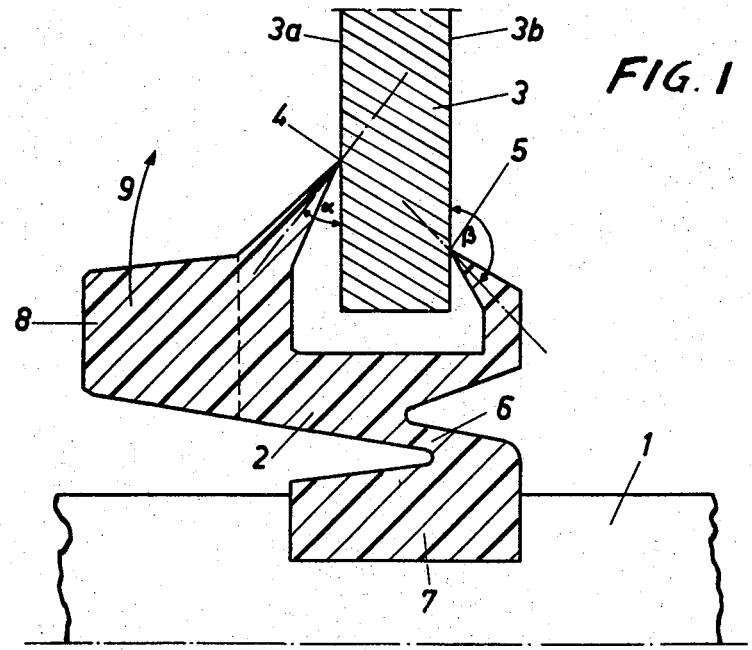
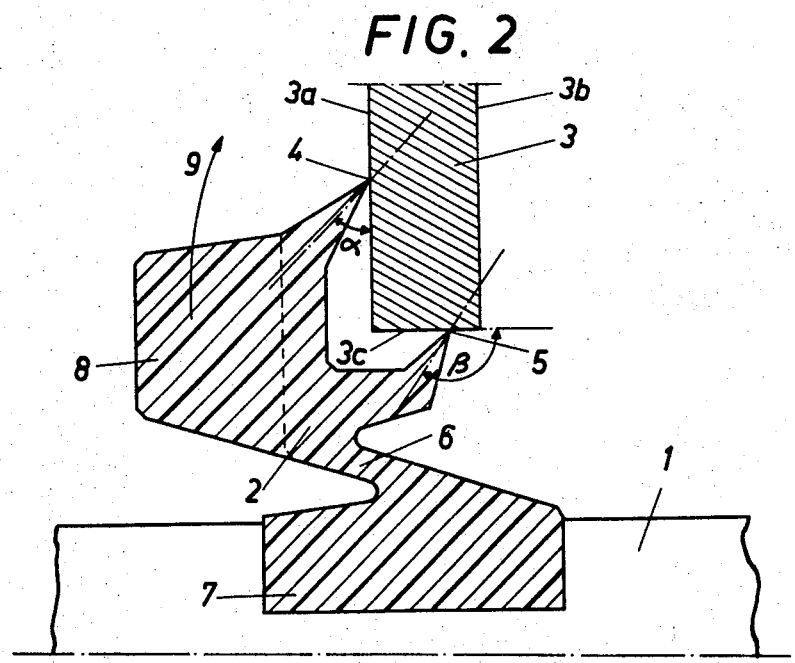

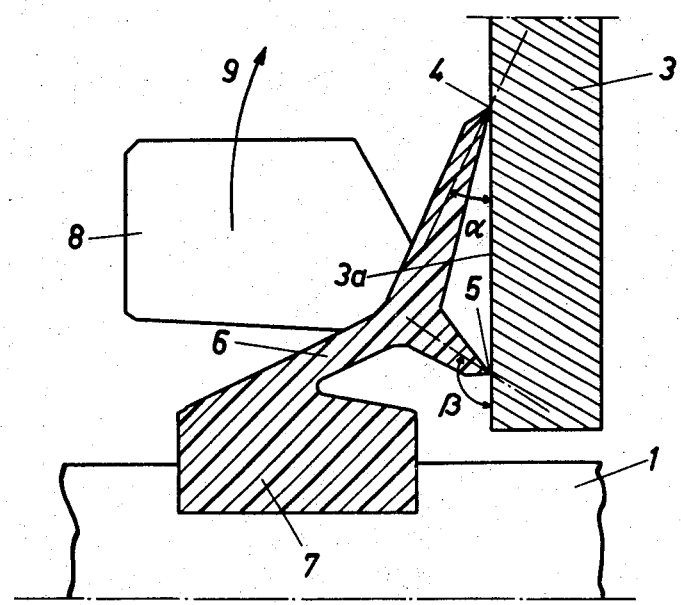
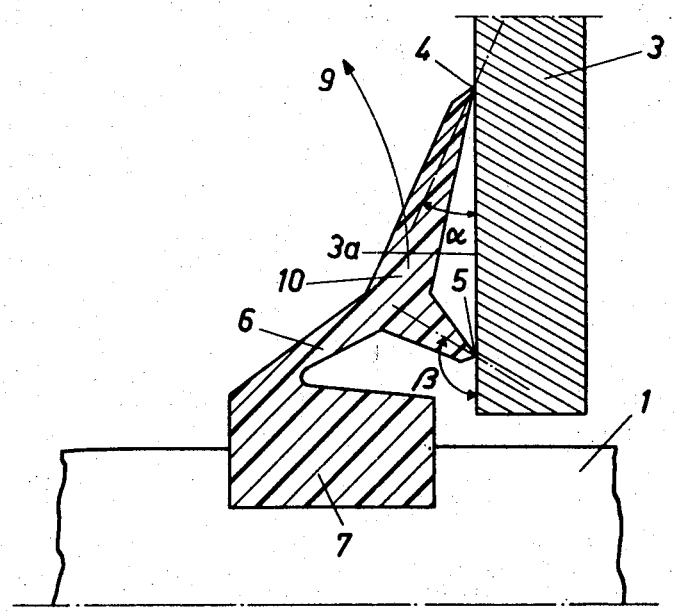

3,606,351
SEAL FOR CIRCULAR SLOTS
Stig Lennart Hallerback, Vastra Frolunda, Sweden, assignor to Aktiebolaget Svenska Kullagerfabriken, Goteborg, Sweden
Filed Oct. 31, 1969, Ser. No. 872,810
Claims priority, application Sweden, Nov. 8, 1968, 15,176/68
Int. Cl. F16j 15/42, 15/54
U.S. Cl. 277—25
5 Claims

ABSTRACT OF THE DISCLOSURE

A seal adapted to be mounted on a rotatable shaft or the like and provide a seal with a member having a sealing surface comprising an annular body portion, a bellows section projecting from said body portion, a seal section including at least two sealing lips projecting from said bellows section and disposed at an angle other than 90° to the sealing surface, said seal section including a mass portion operable to generate centrifugal forces upon rotation of the shaft tending to pivot the seal section about said bellows section to increase the pressure applying relation of one of said lips relative to said sealing surface and decrease the pressure applying relation of another of said lips relative to said sealing surface.

The present invention refers to a seal for circular slots, comprising a sealing ring intended to be adapted to a rotating member and provided with sealing means the positions of which are variable due to centrifugal forces.

Conventional seals, such as radial seals of different shape, are generally provided with spring members in order to obtain required contacting pressure of the sealing lips to overcome the centrifugal forces which tend to deteriorate the sealing function. Such spring members, however, complicate and make the seal more expensive, and rather high friction forces will act upon the members of the seal. This may lead to unfavourable heating. Axial seals such as for instance V-rings may at high speeds not be used successfully, as they are far too responsive to centrifugal forces. In order to be useful the rings under such circumstances would have to be very thick and robust and this would lead to great friction losses.

The present invention refers to a seal which is effective as well when inoperative as when rotating, without in the later state causing great friction losses. The main features of this seal are that the sealing members comprise two or more sealing lips, at least one of which subtending at an angle less than 90° to the surface of a co-operating member and at least one other subtending at an angle more than 90° to the same surface, the surfaces of the sealing member thereby being considered as being located in the same plane of extension, whereby the sealing lips are connected with the fixing portion of the sealing ring by a bellows-like member extending at an angle from the periphery of the fixing portion, whereby the seal at the side opposite to that of the fixing portion may be provided with certain masses in order to increase the mobility of the sealing lips in dependence of the centrifugal forces.

Some embodiments of seals according to the invention are shown in the drawings, FIGS. 1–4 of which all show seals in cross section adapted to a rotating shaft and co-operating with a sealing disc, which may be inoperative or rotating. In the figures corresponding details have been given the same designation.

FIG. 1 shows a seal 2, the sealing ring 7 of which is adapted in a groove in a shaft 1, which is intended to rotate. The sealing ring 7 changes at its outer periphery into an inclined outwardly extending bellows-like member 6 having low rigidity. Extending from the member 6 there are two contracting sealing lips 4 and 5, each contacting one side 3a and 3b respectively of an annular sealing disc 3. Between said disc 3 and the shaft there is formed an annular slot which is to be sealed off. The sealing lip 4 contacts the surface 3a at an angle less than 90°, and the sealing lip 5 contacts the surface 3b at an angle more than 90°. The surfaces are thereby considered as being located in the same plane of extension. At the same side of the disc 3 as the sealing lip 4 there are masses 8 arranged on the seal, which at rotation generate centrifugal forces 9 urging the seal to bend around the member 6. The sealing effect of the sealing lip 4 thus is improved instead of as at conventional seals when the lip due to the centrifugal force is urged to leave the surface. The contact of lip 5 against the surface 3b is reduced and eventually lost. At least one sealing lip will be in contact with the sealing disc whether the seal is rotating or at rest. If the space to the right of the sealing disc, e.g. the inner of a ball bearing, is to be sealed off from the surroundings such sealing-off is obtained under all circumstances. If a positive pressure is built up in the bearing due to the heating, the lubricant will be prevented from leaking through the seal as the sealing lip 5 is pressed against the surface 3b. At a negative pressure due to the cooling the sealing lip 4 will be sucked harder against the surface 3a. Friction during running will be maintained at a low level due to the fact that only one of the sealing lips will contact the sealing element in any essential degree and by the fact that the acting edge of the sealing lip is thin.

FIG. 2 shows a seal, the arrangement and function of which is analog with the seal according to FIG. 1. In this case, however, the sealing lip 5 co-operates with the cylindrical peripheral surface 3c of the sealing member, while the lip 4 as before co-operates wtih the surface 3a.

FIGS. 3 and 4 show seals the two sealing lips 4 and 5 of which co-operate with the same side surface 3a of the sealing member 3. In the embodiment according to FIG. 3 the seal is provided with masses 8 generating centrifugal forces 9, while in the embodiment according to FIG. 4 the mass of the very seal is used for the generating of such force. When rotating at a speed high enough the sealing lip 4 of the seal according to FIG. 3 is pressed against the surface 3a and the sealing lip 5 is relieved from the same surface, while the function of the sealing lips in this respect is changed in the arrangement according to FIG. 4 due to geometrical relations, i.e. at an increase in speed the sealing lip 4 tends to leave the surface 3a while the lip 5 is pressed harder against the said surface.

I claim:

1. A seal adapted to be mounted on a rotatable shaft or the like and provide a seal with a member having a sealing surface comprising an annular body portion, a bellows section projecting from said body portion, a seal section including at least two sealing lips projecting from said bellows section and disposed at an angle other than 90° to the sealing surface, said seal section including a mass portion operable to generate centrifugal forces upon rotation of the shaft tending to pivot the seal section about said bellows section to increase the pressure applying relation of one of said lips relative to said sealing surface and decrease the pressure applying relation of another of said lips relative to said sealing surface.

2. A seal as claimed in claim 1 wherein said member is a disc-formed sealing member wherein one of said sealing lips engages one side of said sealing member and another of said sealing lips engages the other side of said sealing member.

3. A seal as claimed in claim 1 wherein said member is a disc-formed sealing member wherein one of said lips contacts one side of said sealing member and another of said lips contacts the outer periphery of said sealing member.

4. A seal as claimed in claim 1 wherein the member is a disc-formed member and wherein at least two of said lips contact a common side of said sealing member.

5. A seal as claimed in claim 1 wherein said mass portion comprises a plurality of elements disposed at the juncture of said sealing lips and offset relative to said bellows section.

References Cited

UNITED STATES PATENTS 2,657,104  10/1953  Kayser _____ 277—95

FOREIGN PATENTS 66,998  5/1969  Germany _____ 277—25
300,074  4/1968  Sweden _____ 277—82

ROBERT I. SMITH, Primary Examiner

U.S. Cl. X.R.

277—82